Dec. 22, 1931.    B. LYDEN    1,837,457
BRAKING MECHANISM
Filed Oct. 31, 1929    2 Sheets-Sheet 1
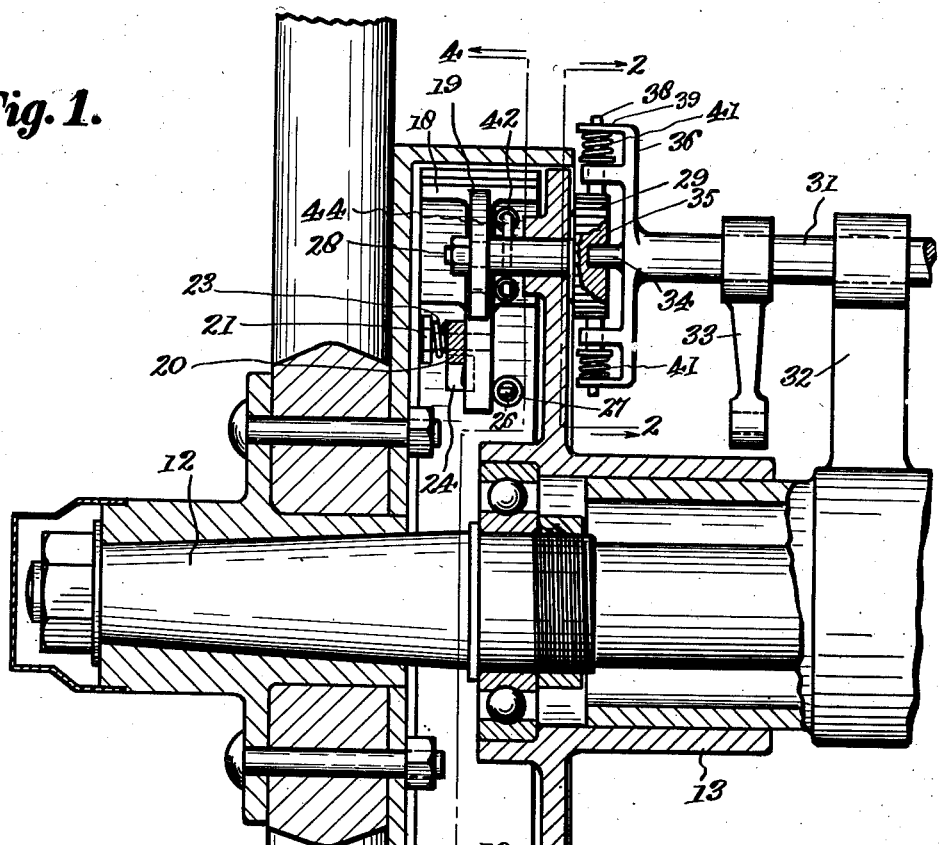
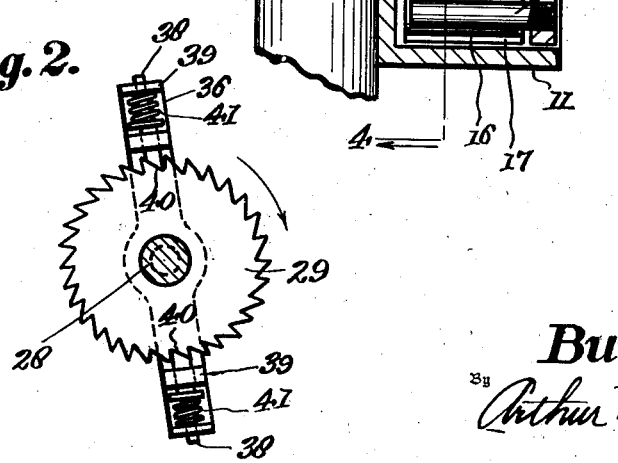
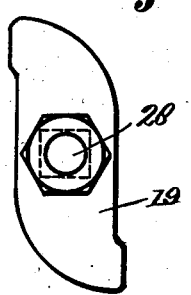
Inventor
Burgal Lyden
By Arthur H. Sturges
Attorney Dec. 22, 1931.                 B. LYDEN                 1,837,457
                          BRAKING MECHANISM
                        Filed Oct. 31, 1929           2 Sheets-Sheet 2

Inventor
Burgal Lyden
By *Arthur H. Sturges*
Attorney

Patented Dec. 22, 1931

1,837,457

UNITED STATES PATENT OFFICE

BURGAL LYDEN, OF NAPONEE, NEBRASKA

BRAKING MECHANISM

Application filed October 31, 1929. Serial No. 403,867.

This invention relates to vehicle brakes, and has relation more particularly to a device of this kind especially designed and adapted for use in connection with automatically-adjusting mechanism for the brakes.

A primary object of the invention is to provide a brake mechanism which will automatically compensate for and take up the wear of the brake lining.

Another object of the invention is to provide a means whereby a constant clearance between the brake drum and the brake lining is maintained.

A further object of the invention is to provide a device which eliminates the possibility of the brake lining "freezing" to the brake drum.

A still further object of the invention is to provide an improved brake mechanism in which the customary structure is not departed from in any essential particular, but by the use of minor modifications and attachments the results claimed are faithfully secured.

Other and further objects and advantages of the invention will be understood from the following detailed description, reference being had to the accompanying drawings, in which like numerals denote like or corresponding parts throughout the several views.

In the drawings:—

Figure 1 illustrates a vertical sectional view of a braking mechanism as applied to a fragment of a vehicle wheel and rear axle.

Figure 2 is a plan view of a ratchet mechanism employed, the view being substantially along the line 2—2 of Figure 1.

Figure 3 is a face view of a double throw cam utilized.

Figure 4:
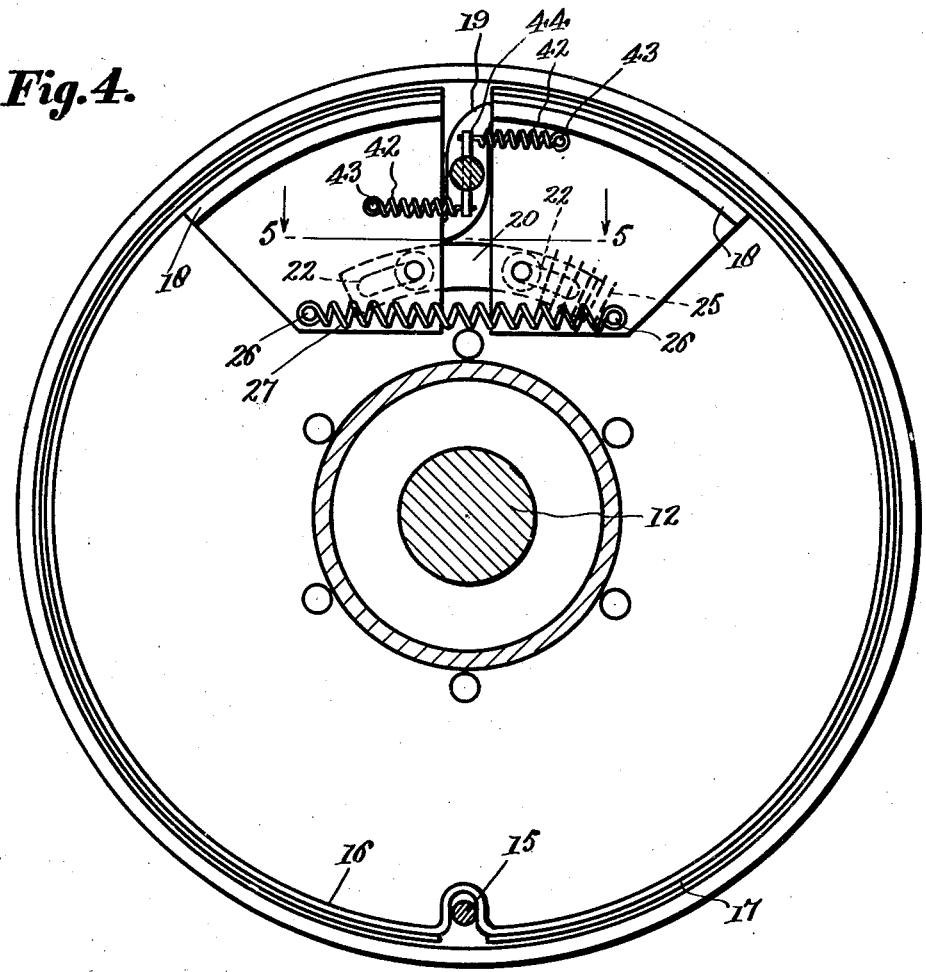
Figure 4 is a face view of the interior of a brake drum, its support or axle being shown in section, the view being taken substantially along the dotted line 4—4 of Figure 1.

From the following description it is thought to be obvious that a brake mechanism constructed in accordance with my invention is particularly well adapted for use by reason of the convenience and facility with which it may be assembled and automatically operated, and it will also be obvious that my invention is susceptible of some change and modification without departing from the principle and spirit thereof, and for this reason I do not wish to be understood as limiting myself to the precise arrangement and formation of the several parts herein shown in carrying out my invention in practice, except as hereinafter claimed.

Referring now to the drawings for a more particular description, the numeral 10 indicates a brake drum which is mounted upon the spokes of a vehicle wheel and provided with an annular flange 11, the latter extending substantially at right angles from the drum 10. The drum is supported from and by an axle of the vehicle in a well known manner, and the latter is equipped with the usual anti-frictional element, such as ball bearings. The axle is indicated at 12 and its housing or support at 13, the latter being attached to the vehicle by means of springs, not shown. The housing 13 is provided with a disc flange 14, the perimeter of which is of substantially the same diameter as the interior of the flange 11 of the brake drum 10.

A stud bolt 15 is secured to the outer face of the disc 14 and is adapted to register with an internally-expansible brake band 16 which, as clearly shown in Figure 4, is prevented from having rotary movements by means of the stud bolt 15, the said band being equipped with a U-shaped portion for engagement with the stud bolt for this purpose.

The band 16 is open at its top in order to permit expansion thereof as later described and it will be understood that the band 16 carries the brake lining 17 which is secured to it by means of rivets in a well known manner.

Adjacent the open portion or end of the brake band 16, a pair of opposed T-shaped tangs 18 are secured to the band, the edges of which are in alignment with said opening. As best shown in Figure 4, a cam 19 is positioned between the tangs 18 and adapted to bear against their edges for expanding the latter, the tangs being secured by means of rivets or welding to the band 16, and it will be understood that, when the cam 19 is moved, by a later described means, the tangs 18 and the band 16 will have corresponding movements in a manner whereby the brake lining 17 will be caused to engage against the inner perimeter or wall of the flange 11 of the brake drum 10.

Figure 5:
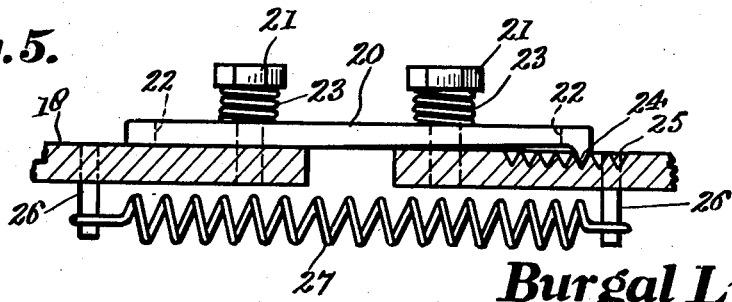
Figure 5 is an enlarged sectional view of a portion of the mechanism, the view being taken substantially along the dotted line 5—5 of Figure 4 and looking in the direction of the arrows and showing a take-up mechanism.

Referring particularly to Figures 4 and 5, a strap latch 20 is employed for connecting the two tangs 18 together for purposes later described. Each tang 18 is provided with a stud bolt 21, which carries the latch 20, the latter being adapted to have slidable movements upon the bolt 21 while secured thereby, and it will be noted, particularly in Figure 4, that the latch 20 is provided with elongated slots 22 for permitting said sliding movements. Springs 23 are mounted upon the bolts 21 and, as shown in Figure 5, are adapted to compress the latch 20 against the faces of the tangs 18.

As shown particularly in Figure 5, the latch 20 is provided with a finger 24 which is adapted to engage in toothed recesses 25 formed upon the face of one of the tangs 18, and it will be understood that the finger 24 will automatically engage within a selected recess and against a selected tooth 25, as later described.

Each tang 18 carries a pin 26 upon its face which is adapted to support a contracting spring 27 which is utilized for the purpose of drawing the tangs 18 towards each other at all times and thereby moving the brake lining 17 away from the flange 11, said position being the normal position of the parts, and it will be understood that, when the cam 19 is moved, as later described, that the lining 17 may be expanded outwardly and caused to contact with the brake drum, the movement of said cam overcoming the force of the spring 27 for said purpose.

As best shown in Figure 1, the cam 19 is mounted upon a rotatable shaft 28, in a manner whereby the cam 19 will have corresponding movements with said shaft at all times. The shaft 28 is journaled in and carried by the disc 14 of the axle housing 13. The shaft 28 is preferably formed integral with a toothed wheel 29 which is positioned upon the side of the disc 14 opposite to the cam 19.

A shaft 31 is journaled in and supported by any suitable means from the rear axle housing, such as by the arm 32, shown in Figure 1.

The shaft 31 may extend transversely of and in alignment with the axle 12 and it will be understood that a similar braking mechanism is mounted upon the wheel opposite to the one here described, and that, when the shaft 31 is moved, it will cause a corresponding movement to the braking mechanism upon both said wheels. An arm 33 is splined to or otherwise suitably secured upon the shaft 31 and the arm 33 is connected to the foot pedal or hand brake lever of the vehicle through a system of bell-crank levers and connecting rods, which are not shown.

The shaft 31 is provided with a pintle end 34 which is adapted to be journaled and centered in a recess 35 formed in the face of the toothed ratchet wheel 29.

The shaft 31 is further provided with an arm 36 which, as best shown in Figure 2, carries a pin or a pair of pins 38, adapted to have sliding movements through and be supported by the fingers 39 of the arm 36.

The pins 38 are provided with beveled ends 40 which are adapted to engage the teeth of the ratchet wheel 29 and to be retained in such engagement by means of springs 41 as shown in Figure 2.

In operation, the brakes may be applied by the operator by causing a movement of the arm lever 33 with an attendant movement of the shaft 31 and its arm 36, thereby causing a corresponding movement of the ratchet wheel 29 and the cam 19. The cam 19 being rotated will cause the brake bands to expand as heretofore described. Upon release of the brake mechanism the spring 27 will cause the ends of the brake band 16 to be moved towards each other, thereby releasing the brake lining 17 from the drum, the cam 19 being returned to a normal position by means of the spring 27 on the tangs 18. It will be noted that the springs 42 cause the beveled operating edges of the cam 19 to constantly engage against the tangs 18, thereby eliminating lost motion during the application of the cam to the tangs. Also, it will be obvious that the springs 42 will cause corresponding movements of the ratchet wheel 29 and the cam 19 in a manner whereby the arm 36, upon assuming a normal operative position, will cause its latch pins 38 to engage with a new notch or tooth 40 of the ratchet wheel 29 at all times when previously thereto the finger 24 of the take up strap latch 20 has engaged a new tooth 25 of a tang 18, thereby taking up and compensating for the wear of the brake lining 17. The springs 42 are preferably secured to the tangs by means of the pins 43 and to the cam shaft 28 by any suitable means, such as the lever pin 44.

From the foregoing description it will be noted that, when the cam 19 is rotated, thereby causing the tangs 18 to move away from each other and assuming that the brake lining is worn out to an appreciable extent, a stud bolt 21, which is carried by a tang 18, will strike the end of a slot 22 of the strap 20 and thereby cause a pull upon the strap in a manner whereby the finger 24 of the strap will move up or check up one notch or one tooth 25 formed in the plate 18, as heretofore described, and that this will be done against the force of the spring 27. When the cam 19 is moved again it will be noted that the parts will have a new relative position and that the wear has been taken up by means of the finger 24 having engaged in a new notch or tooth 25. Similarly, the pins 38 carried by the arms 36 of the shaft 31 will correspondingly check ahead one tooth or notch upon the ratchet wheel 29, and it will be understood that the preferred relation as to the size of the teeth of the ratchet wheel 29 and the small teeth 25 formed upon the tang 18 is equal, so that no lost motion of the parts will be provided and that, when the finger 24 of the strap 20 checks ahead one notch to compensate for the wear of the brake lining 17, a similar checking ahead of one notch will take place upon the ratchet wheel 29 at times when the relative position of the parts permit the same.

By the foregoing means it will be noted that the wear of the brake lining 17 will be automatically compensated for by the device herein described and, therefore, good braking service will be provided for the vehicle in an automatic manner whereby no attention of the operator is required for this desideratum.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. A brake mechanism comprising a brake band, a lining therefor, tangs on the split ends of the band, a cam to force the tangs apart, a spring to contract the tangs, and a strap having slidable and interlocking relation to the tangs for compensating for wear in the lining.

2. A brake mechanism comprising a brake band, a lining therefor, tangs at the ends of the band, a cam to open the tangs, a spring to close the tangs, a slotted and toothed strap placed against said tangs, one of the tangs having cooperating teeth to receive the toothed strap, and spring-pressed bolts extending through the slotted portions of the strap.

3. A brake mechanism comprising a band, a lining therefor, tangs at the split ends of the band, a cam for opening said tangs, a ratchet wheel for moving said cam, means to yieldably hold the cam against the tangs to avoid lost motion, a pawl arrangement for driving said ratchet wheel, yieldable means to close the tangs, and toothed means on the tangs cooperating with said ratchet and pawl device to compensate for the wear in the lining.

4. A brake mechanism comprising a brake band, a lining therefor, means to contract and expand the band, tangs on the split ends of the band adapted to be actuated by said means, and a strap loosely and yieldably carried by said tangs for compensating for wear in the lining.

In testimony whereof, I have affixed my signature.

BURGAL LYDEN.